United States Patent [19]

Tanaka et al.

[11] Patent Number: 4,641,337
[45] Date of Patent: Feb. 3, 1987

[54] KEY TELEPHONE SYSTEM WITH MEANS FOR OPERATIVELY CONNECTING ANOTHER KEY TELEPHONE SYSTEMS

[75] Inventors: Jouji Tanaka; Tetunobu Watanabe, both of Kawasaki; Yoshiji Tanimoto; Minoru Okumura, both of Tokyo, all of Japan

[73] Assignees: Nitsuko Limited, Kawasaki; Nippon Telegraph and Telephone Corporation, Tokyo, both of Japan

[21] Appl. No.: 843,707

[22] Filed: Mar. 25, 1986

[30] Foreign Application Priority Data

Mar. 25, 1985 [JP] Japan .................................. 60-58540
Mar. 25, 1985 [JP] Japan .................................. 60-58541

[51] Int. Cl.$^4$ ............................................. H04Q 5/20
[52] U.S. Cl. .................................... 379/162; 379/163
[58] Field of Search ................ 179/99 H, 99 R, 99 M, 179/99 LC

[56] References Cited

U.S. PATENT DOCUMENTS

| | | | |
|---|---|---|---|
| 4,160,131 | 7/1979 | Kaul et al. ........................ | 179/99 M |
| 4,184,054 | 1/1980 | Shibata et al. .................... | 179/99 M |
| 4,347,409 | 8/1982 | Ogawa et al. ..................... | 179/99 R |

*Primary Examiner*—Gene Z. Rubinson
*Assistant Examiner*—David R. Schuster
*Attorney, Agent, or Firm*—Frishauf, Holtz, Goodman & Woodward

[57] ABSTRACT

A key telephone system comprising a main equipment and a plurality of key telephones connected to the main equipment and comprising elements for operatively connecting another similar key telephone system. The main equipment in the key telephone system comprises a system call transmitting interface and a system call receiving interface which are connected through connecting lines to a system call receiving interface and a system call transmitting interface in a main equipment of another similar key telephone system, respectively. Each key telephone in both systems comprises an additional key for selecting the system call transmitting interface of its own main equipment. By use of the additional key in one key telephone, a speech path can be established between the one key telephone and another key telephone in another key telephone system through both main equipments and the connecting line. By operation of the additional key after operation of a holding key of a key telephone in a key telephone system, an office line call to the key telephone is transferred to a key telephone in the other key telephone system through the connecting line.

9 Claims, 4 Drawing Figures

KEY TELEPHONE SYSTEM WITH MEANS FOR OPERATIVELY CONNECTING ANOTHER KEY TELEPHONE SYSTEMS

BACKGROUND OF THE INVENTION

1. Field of the Invention

The present invention relates to key telephone systems, and in particular, to operative connection of separate key telephone systems.

2. Description of the Prior Art

Key telephone systems of a type are known in the prior art wherein respective key telephone sets are connected to a main equipment through connecting cables, as disclosed in, for example, U.S. Pat. No. 4,347,409 by Ogawa et al, assigned to Nippon Telegraph & Telephone Public Corporation and Nippon Tsushin Kogyo Kabushiki Kaisha.

In the known key telephone system, the main equipment comprises at least one office line interface circuit connected to the office line, a plurality of key telephone interface circuits connected to key telephone sets, respectively, a switching such as office line selection keys, an interextension call key, and others, and a set of dialling keys or ten keys.

In the key telephone system, a speech path can be established through the main equipment between any one of key telephones and another one by operation of the interextension key and the ten keys at the any one of key telephones. Moreover, any one of key telephones can be connected to the office line by operation of the office line selection key.

Such a type of key telephone system is well known in the prior art and is disclosed in, for example, U.S. Pat. No. 4,347,409 by Ogawa et al, assigned to Nippon Telegraph & Telephone Public Corporation and Nippon Tsushin Kogyo Kabushiki Kaisha.

In use of the key telephone system as established, addition of key telephone sets and/or office lines are limited by the permitted maximum number. This means that the user must replace the using system by a new system of a longer scale.

Moreover, when two similar key telephone systems are used at separate but near areas, these two key telephone systems cannot be connected to each other.

SUMMARY OF THE INVENTION

An object of the present invention is to provide a key telephone system which can be operatively connected to another similar key telephone system.

As described above, the key telephone system generally comprises a main equipment connected to at least one office line and a plurality of key telephone sets connected to the main equipment, the main equipment comprising an office line interface circuit connected to the office line, a plurality of key telephone interface circuits connected to the key telephone sets, respectively, a switching matrix having cross points for selectively connecting one of the key telephone interface circuits to another one and for selectively connecting the office line interface circuit to one of the key telephone interface circuits, and a main control means connected to the office line interface circuit, the key telephone interface circuits, and the switching matrix and for controlling the switching matrix to perform selected cross-point switching in response to a call request signal. The key telephone system of the present invention further comprises each of the key telephone sets comprising a system selection key for producing a system call request signal by pushing the system selection key, the main equipment comprising a system interfce circuit to be connected to another key telephone system through a connecting line, the switching matrix comprising cross points for selectively connecting one of the key telephone interface circuits to the system interface circuit, and the main control means controlling the switching matrix in response to the system call request signal to connect one of the key telephone interface circuits to the system interface circuit, whereby the key telephone sets may be operatively connected to the another key telephone system through the connecting line.

According to an aspect of the present invention, two similar key telephone systems can be operatively connected to each other so that a speech path can be readily established between any one of key telephone sets in one of key telephone systems and any one of key telephone sets in the other system.

According to another aspect of the present invention, an office line call into a key telephone system can be transferred to another similar key telephone system.

Further objects, features and other aspects will be understood from the following detailed description of preferred embodiments referring to the accompanying drawings.

DETAILED DESCRIPTION OF PREFERRED EMBODIMENTS

Figure 1A:
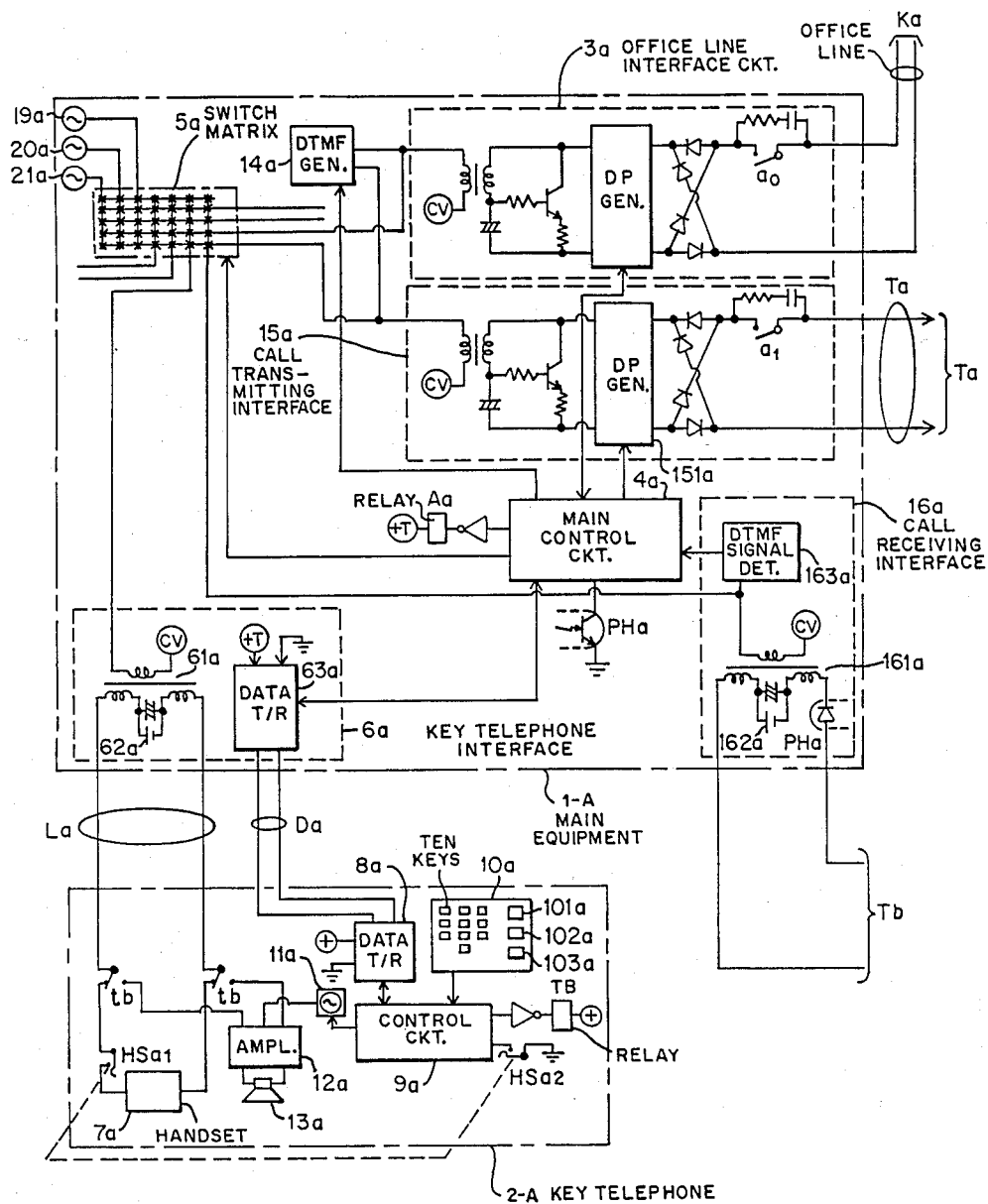
FIG. 1(a) is a block diagram of a key telephone system according to an embodiment of the present invention.

Referring to FIG. 1(a), a key telephone system shown therein comprises a main equipment 1-A and a plurality of key telephone sets, one of which is shown at 2-A.

Main equipment 1-A comprises an office-line interface circuit 3a connected to an office line. The office-line interface circuit 3a is for detecting an incoming call signal through the office line, as well as for sending out dial impulses under control of a main control circuit 4a.

A plurality of office-line interface circuits can be provided to connect a plurality of office lines.

The office line is connected to a switch matrix 5a through the office-line interface circuit.

Main equipment 1-A further comprises a plurality of key-telephone interface circuits connected to key telephones, respectively. One of key-telephone interface circuits is shown at 6a and is connected to key telephone 2-A through a talking path La and a data line Da.

Key-telephone interface circuit 6a comprises a transformer 61a and a power source 62a connected to the talking path La. The transformer 61a is also connected to switch matrix 5a. A voice signal is transferred from talking path La to switch matrix 5a, or from switch matrix 5a to talking path La, through the transformer.

The key-telephone interface circuit 6a further comprises a data transmitter and receiver circuit 63a connected to main control circuit 4a and data line Da. The data transmitter and receiver circuit 63a sends out data signals from main control circuits 4a onto data line Da, and receives data signals on data line Da from key telephone 2-A. The received data signals are transferred to main control circuit 41.

Main control circuit 4a controls switch matrix 5a to establish cross-point switchings in response to data signals from office-line interface circuits and data transmitter and receiver circuit 63a. The main control circuit 4a further controls office-line interface circuit 3a and also sends out various control data signals to data transmitter and receiver circuit 63a.

Each key telephone 2-A comprises a handset 7a including a voice transmitter and receiver connected to talking path La through a hook switch HSa₁, a data transmitter and receiver circuit 8a connected to data line Da, and a control circuit 9a connected to data transmitter and receiver circuit 8a.

Key telephone 2-A further comprises a set of keys and indicators 10a which comprises function keys such as an office line selection key or keys, an interextending call key, and others, indicators associating with function keys, and a dialling keys or a ten keys. The key and indicator unit 10a is connected to control circuit 9a, and indicators are controlled by data signals from main equipment 1-A through data line Da, while operated key data signals are transmitted to main equipment 1-A through data line Da.

Key telephone 2-A further comprises a ringing tone generator 11a, an amplifier 12a and a speaker 13a. The ringing tone generator 11a is connected to control circuit 9a and is driven by a control data signal from main equipment 1-A through data line Da. The ringing tone is amplified at amplifier 12a and outputted from speaker 13a.

The amplifier 12a is selectively connected to talking path La through contacts tb of a relay TB for hands free talking. The TB relay is also connected to control circuit 9a.

In FIG. 1a, 14a is a dual tone multifrequency (DTMF) generator for generating a DTMF signal in place of a dial impulse signal under control of main control circuit 4a.

The above-described arrangement of the key telephone system is well known in the art, as disclosed in, for example, the above-described U.S. Pat. No. 4,347,409. Accordingly, the detailed description as to operation will be omitted. However, it is noted that although the second voice signal path is provided for transmitting the ringing tone to each key telephone and for establishing the hands-free talking in U.S. Pat. No. 4,347,409, the system of FIG. 1(a) does not use such a second voice signal path. Each key telephone 2-A of FIG. 1(a) is provided with the ringing tone generator 11a for generating the ringing tone, and relay TB for the hands-free talking.

Figure 1B:
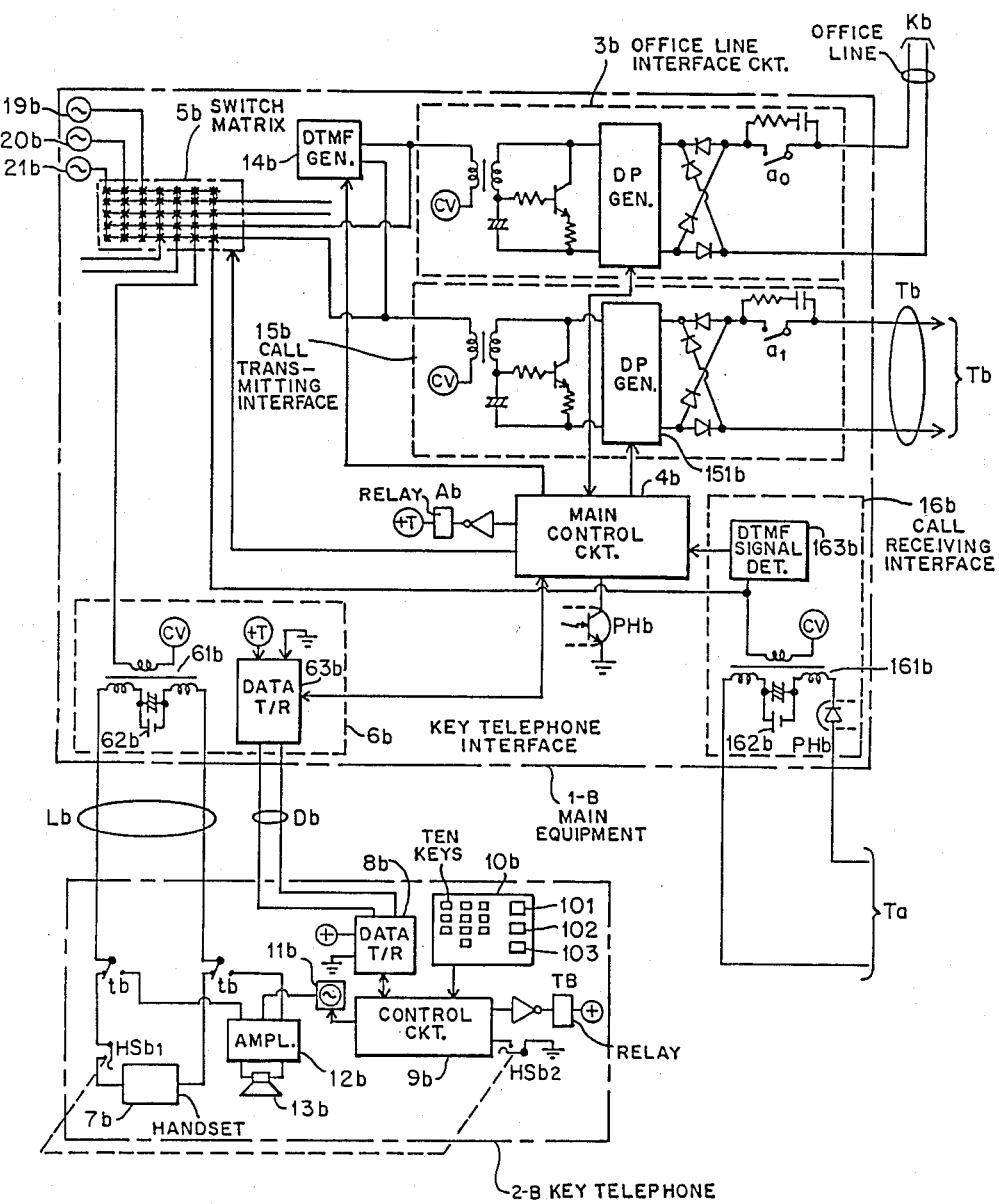
FIG. 1(b) is a block diagram of another key telephone system similar to FIG. 1(a), which is connected to FIG. 1(a)

In order to enable to operatively connect between two key telephone systems, main equipment 1-A is provided with at least one system connection interface comprising a call transmitting interface circuit 15a and a call receiving interface 16a. The call transmitting interface circuit 15a and call receiving interface circuit 16a are connected to another similar key telephone system as shown in FIG. 1(b), through connecting lines Ta and Tb.

The call transmitting interface circuit 15a can be formed similar to the office line interface circuit 3a but is not required to have the incoming call signal detecting function. The call transmitting interface circuit 15a has a dial impulse generator 151a which is under control of main control circuit 4a.

The connecting line Ta is coupled to switch matrix 5a through the call transmitting interface circuit 15a and DTMF generator 14a.

The call receiving interface circuit 16a has a transformer 161a for coupling the connecting line Tb with switch matrix 5a, and a power source 162a for supplying a speech current to connecting line Tb.

The call receiving interface circuit 16a is further provided with a photo coupler PHa for detecting an incoming dial impulse signal on connecting line Tb. The photo coupler PHA comprises a light emission diode connected to a connecting line Tb, and a photo transistor connected to main control circuit 4a.

The call receiving interface circuit 16a is further provided with a DTMF signal detector 163a for detecting an incoming DTMF signal on connecting line Tb. The detected signal is transferred to the main control circuit 4a.

If one of the dial impulse signal and the DTMF signal is only used but the other is not used, one of the photo coupler PHa and the DTMF signal detector 163a can be omitted according to the non-used one.

Each key telephone 2-A is provided with a system call selection key 103 associating with an indication lamp.

FIG. 1(b) is a block diagram of another key telephone system having an arrangement similar to that of FIG. 1(a). Similar parts are represented by similar reference symbols with suffixes "B" and "b" in place of "A" and "a" in FIG. 1(a).

Now, description will be made as to talking operation between these two key telephone system of FIGS. 1(a) and 1(b) connected to one another through connecting lines Ta and Tb.

Call transmitting interface circuit 15a in FIG. 1(a) is connected to call receiving interface circuit 16b in FIG. 1(b) through connecting line Ta, while call receiving interface circuit 16a in FIG. 1(a) is connected to call transmitting interface circuit 15b in FIG. 1(b) through connecting line Tb.

When an interextension call is desired from key telephone 2-A of the system of FIG. 1(a) to key telephone 2-B, system call key 103a is pushed at key telephone 2-A and handset 7a is lifted up. In response to the key operation, control circuit 9a produces a system call request signal. The off-hook signal and the system call request signal are transmitted to main equipment 1-A from data transmitter and receiver circuit 8a through data line Da, and are inputted to main control circuit 4a through data transmitter and receiver circuit 63a.

Main control circuit 4a drives a relay Aa in the call transmitting interface circuit 15a to close its contact a₁, and control switch matrix 5a so as to establish cross-point switching for connecting the call transmitting interface circuit 15a to key telephone interface circuit 6a. Accordingly, the connecting line Ta and the talking path La are operatively connected to each other.

Then, the main control circuit 4a produces indicator signals for lamps associated to system call keys in all key telephones 2-A. The indicator signals are transferred to respective key telephones through respective data lines, and the lamps are illuminated to indicate the use of the call transmitting interface circuit 15a.

Then, ten keys are operated at key telephones 2-A to input a predetermined number for identifying an interextension call. The number is transferred to main control circuit 4a through data line Da. Main control circuit 4a drives a predetermined one of the dial impulse generator 151a and the DTMF signal generator 14a so as to send out a signal of the number to connecting line Ta.

The signal of the number is detected at either one of the photo coupler PHb or DTMF signal detector 163b, and the detected signal is applied to main control circuit 4b.

When the interextension call is permitted, main control circuit 4b controls switch matrix 5b to connect the interface 16b to a dial tone generator 19b. The dial tone signal is transmitted to the receiver of handset 7a at key telephone 2-A through call receiving interface circuit 16b, connecting line Ta, call transmitting interface circuit 15a, switch matrix 5a, key telephone interface circuit 6a, and talking path La.

Then, ten keys of key telephone 2-A is operated to produce a data signal of an address number of the key telephone 2-B. The data signal is similarly transferred to main control circuit 4a through data line Da. Main control circuit again drives a predetermined one of dial impulse generator 151a and DTMF signal generator 14a to send out the address number signal onto the connecting line Ta.

Upon reception of the address number through call receiving interface circuit 16b, main control circuit 4b controls switch matrix 5b to connect a ring-back tone generator 20b to the interface circuit 16b, and produce a ringing tone drive signal for data transmitter and receiver circuit 63b. Then, ring-back tone is transmitted to the receiver of handset 7a of key telephone 2-A through the similar path of the dial tone transmission. While, the ringing tone drive signal is transmitted to control circuit 9b of key telephone 2-B through data line Db and data transmitter and receiver circuit 8b.

Then, control circuit 9b drives ringing tone generator 11b, so that ringing tone is produced from speaker 13b at key telephone 2-B.

When handset 7b is lifted up at key telephone 2-B, control circuit 9b stops operation of ringing tone generator 11b and transmits an on-hook signal to main equipment 1-B through data transmitter and receiver circuit 8b and data line Db.

In response to the off-hook signal, main control circuit 4b controls switch matrix 5b to connect the interface circuit 16b to key telephone interface circuit 6b with the ring-back tone generator 20b being disconnected.

Thus, a talking path is established between the transmitter and receiver of the handset 7a of key telephone 2-A and those of the handset 7b of key telephone 2-B, through talking path La, key telephone interface circuit 6a, switch matrix 5a, call transmitting interface circuit 15a, connecting line Ta, call receiving interface 16b, switch matrix 5b, key telephone interface circuit 6b, and talking path Lb.

After completion of conversation, when handsets 7a and 7b are put on respective key telephones 2-A and 2-B, on-hook signals are transmitted from respective key telephones 2-A and 2-B to respective main control circuits 4a and 4b. Then, both key telephone systems are set into the initial condition.

In the above-described operation, when the interextension call is not permitted, main control circuit 4b controls switch matrix to connect the interface circuit 16b to a busy tone generator 21b. Then, the busy tone is transmitted to the receiver of handset 7a of key telephone 2-A.

During operation of ringing tone generator 11b, ten keys at key telephone 2-A can be operated to produce a predetermined number for indicating a voice call. The voice call number is transmitted to main control circuit 4a. A signal of the number is transmitted to connecting line Ta by driving dial impulse generator 151a or DTMF signal generator 14a.

Upon receiving the number signal, main control circuit 4b controls switch matrix 5b to connect the interface circuit 16b to key telephone interface circuit 6b with ring-back tone generator 20b being disconnected. Main control circuit 4b further produces a TB relay operating signal and a ringing tone stop signal which are transmitted to control circuit 9b in key telephone 2-B through data line Db. Therefore, ringing tone generator 11b is stopped and relay TB is operated to connect amplifier 12b to talking path Lb through operated relay contacts tb. Thus, the transmitter of handset 7a of key telephone 2-A is operatively connected to speaker 13b of key telephone 2-B. Therefore, the voice call can be performed.

In response to the voice call, handset 7b is lifted up at key telephone 2-B, off-hook signal is produced and transmitted to main control circuit 4b. Then, main control circuit 4b produces a relay restoring signal and transmits the signal to control circuit 9b. Thus, relay TB is restored and the transmitter and receiver of handset 7b is connected to talking path Lb with amplifier 12b being disconnected from the talking path. Accordingly, the transmitter and receiver of the handset 7a of key telephone 2-A are operatively connected to those of handset 7b of key telephone 2-B.

The main equipment can be provided with a plurality of system connection interface circuit (15a–16a) for enabling connection with a plurality of similar key telephone systems. Then, each key telephone is also provided with a plurality of system call keys.

Figure 2A:
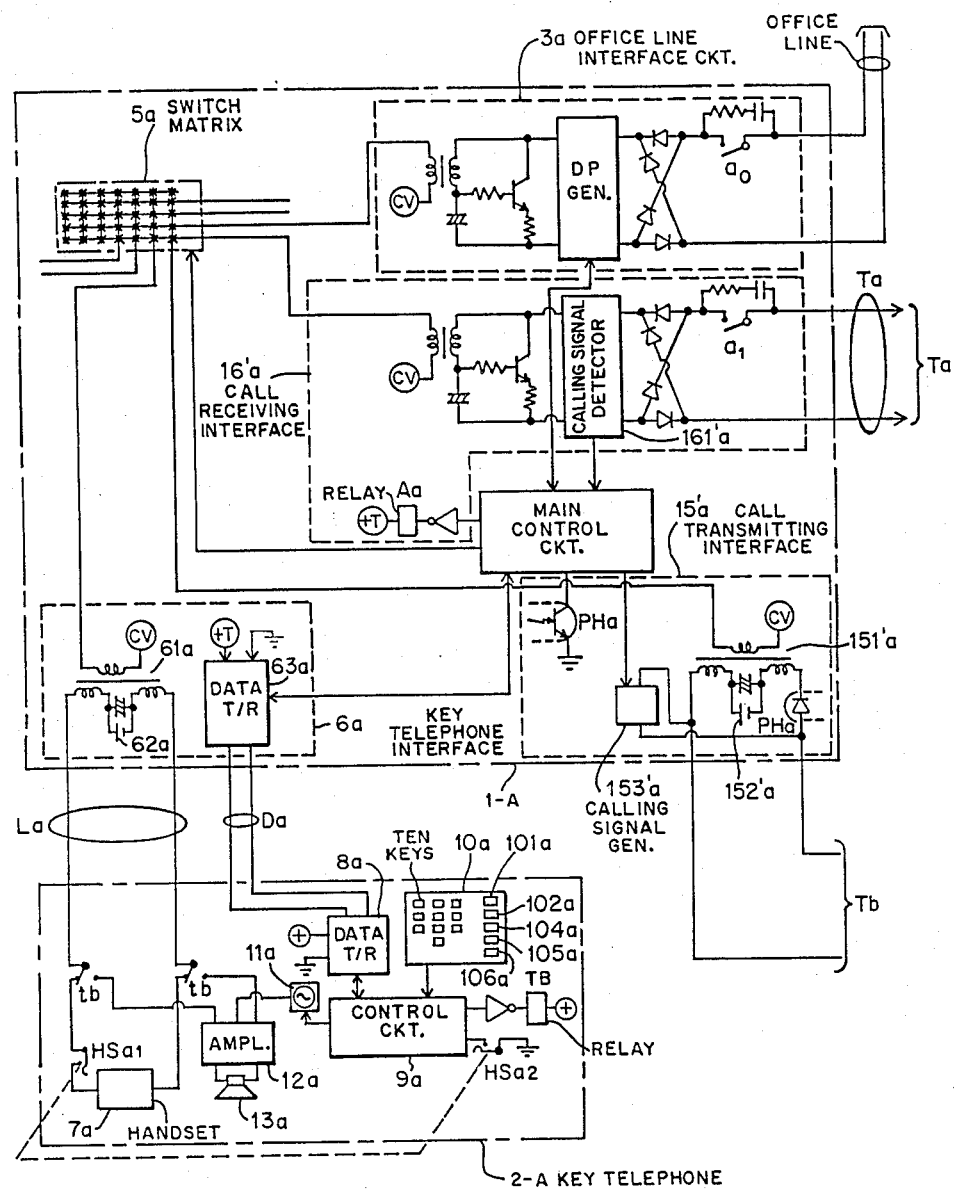
FIG. 2(a) is a block diagram of a key telephone system according to another embodiment of the present invention.

Referring to FIG. 2(a), another embodiment is described below. The shown key telephone system is similar to the key telephone system of FIG. 1(a) but is different therefrom mainly in the arrangements of call transmitting interface circuit 15'a and call receiving interface circuit 16'a.

The similar parts are represented by the same reference characters as in FIG. 1(a), and detailed description thereto is omitted.

Call transmitting interface circuit 15'a comprises a transformer 151'a for coupling a connecting line Ta to a switch matrix 5a, a power source 152'a for supplying a speech current onto connecting line Ta, and a calling signal generator 153'a for sending out a calling signal onto connecting line Ta under control by main control circuit 4a. The call transmitting circuit 15'a is further provided with a photo coupler PHa for detecting a disconnection signal as described hereinafter. A light emission diode of the photo coupler PHa is connected to connecting line Ta, and a photo transistor thereof is connected to main control circuit 4a.

Call receiving interface circuit 16'a can be arranged to be similar to office line interface circuit 3a but is not necessary to have an address signal sending-out function. The call receiving interface circuit 16'a has an incoming call signal detector 161'a and a connecting line seizing relay Aa. The relay Aa is controlled by main control circuit 4a to close its contact a₁ for seizure of connecting line Tb.

The connecting line Tb is also coupled to switch matrix 5a through call receiving interface circuit 16'a.

In each key telephone 2-A, keys and indicators unit 10'a comprises a holding key 104a with its indicator, a system call key 105a with indicator, and a system call response key 106a with its indicator in addition to ten keys, an office line selection key 101a, and an interextension call key 102a.

Figure 2B:
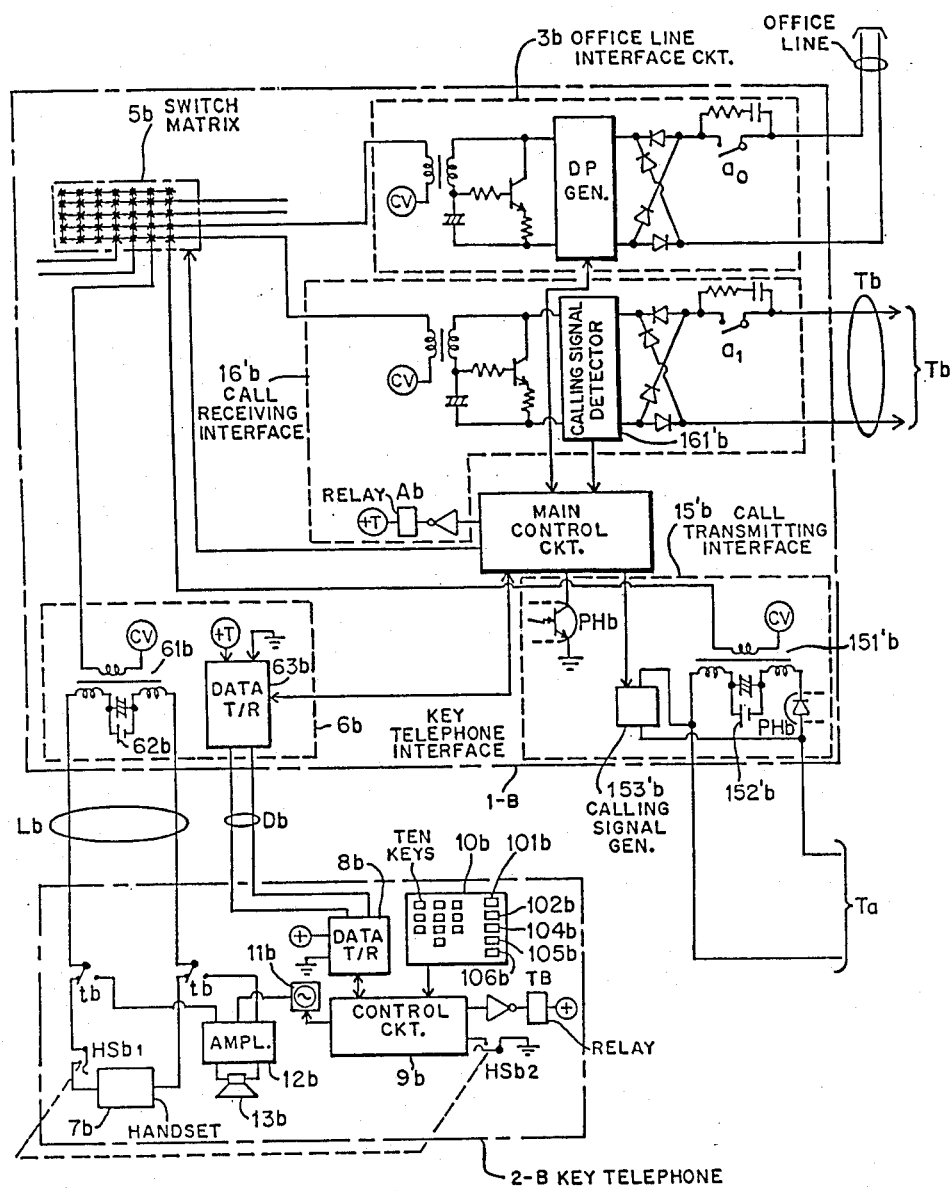
FIG. 2(b) is a block diagram of another key telephone system which is similar to and connected to FIG. 2(a).

FIG. 2(b) is a block diagram of another key telephone system having an arrangement similar to that of FIG. 2(a). Similar parts are represented by similar reference characters with suffixes "B" and "b" in place of "A" and "a" in FIG. 2(a).

Now, description will be made as to talking operation between these two key telephone systems of FIGS. 2(a) and 2(b) connected to each other through connecting lines Ta and Tb.

Call transmitting interface circuit 15'a in FIG. 2(a) is connected to call receiving interface circuit 16'b in FIG. 2(b) through connecting line Ta, while call receiving interface circuit 16'a in FIG. 2(a) is connected to call transmitting interface circuit 15'b in FIG. 2(b) through connecting line Tb.

When an interextension call is desired from key telephone 2-B of the system of FIG. 2(b) to key telephone 2-A in FIG. 2(a), system call key 103b is pushed at key telephone 2-B and handset 7b is lifted up. In response to the operation, control circuit 9b produces a system call request signal and an off-hook signal, which are transmitted to main control circuit 4b through data line Db.

Main control circuit 4b drives calling signal generator 153'a in call transmitting interface circuit 15'b to send out the calling signal of, for example, 16 Hz onto connecting line Tb, and produces system call lamp luminescent signals for all key telephones 2-B. The main control circuit 4b also controls switch matrix 5b to connect the talking path Lb and interface circuit 15'b.

In call receiving interface circuit 16'a, the calling signal is detected by call signal detector 161'a, and the detected signal is applied to main control circuit 4a.

Main control circuit 4a produces a system call receiving lamp signal and a ringing tone operating signal which are transmitted to each key telephone 2-A through each data line Da. Accordingly, in each key telephone 2-A, the system call receiving key lamp illuminates repeatedly and ringing tone generator 11a is actuated to produce the ringing tone from speaker 13a.

When a handset 7a of one key telephone 2-A is lifted up in response to the ringing tone and the system call receiving key 106a is pushed, control circuit 9a produce an off-hook signal and the system call receiving key signal which are transmitted to main control circuit 4a through data line Da.

Main control circuit 4a produces a ringing tone stop signal and a system call receiving lamp signal, which are transmitted to each key telephone 2-A. In addition to this, main control circuit 4a drives seizure relay Aa to close its contact a₁ so that the connecting line Tb is seized, and also controls switch matrix 5a to connect the system call receiving interface circuit 16'a and key telephone interface 6a. Accordingly, a speech path is established between key telephones 2-B and 2-A through talking path Lb, key telephone interface 6b, switch matrix 5b, system call interface circuit 15'b, connecting line Tb, system call receiving interface circuit 16'a, switch matrix 5a, key telephone interface circuit 6a, and talking path La.

In the embodiment of FIGS. 2(a) and 2(b), an office line call in one key telephone system can be transferred to the other key telephone system.

In the system of FIG. 2(b), key telephone 2-B is now considered to be operatively connected to the office line through talking path Lb, key telephone interface circuit 6b, switch matrix 5b, and office-line interface circuit 3b. Description is omitted as to operation to establish the speech path because it is well known in the conventional key telephone system.

In order to transfer the office line call to the system of FIG. 2(a), holding key 104b is depressed at key telephone 2-B. Then, a holding data signal is produced by control circuit 9b and is transmitted to main control circuit 4b through data line Db.

In response to holding data signal, main control circuit 4b controls switch matrix 5b to connect the office-line interface circuit 3b to a holding tone generator 22b, and produces a holding lamp signal which are transmitted to each key telephone 2-B through each data line Db. In each key telephone, office line key lamp 101a is repeatedly illuminated to indicate the holding condition of the office line.

Further, system call key 103b is pushed at key telephone 2-B. Then, the key telephone 2-B is connected to key telephone 2-A in the similar manner as the above-described interextension call.

Thereafter, when the handset 7b is put on the key telephone 2-B, the on-hook signal is transmitted to main control circuit 4b through data line Db. Then, main control circuit 4b controls switch matrix 5b to disconnect the interface circuit 15'b from the holding tone generator 22b and to connect the interface circuit 15'b to the office-line interface circuit 3b. Thus, the office line OFb is operatively connected to the key telephone 2-A, that is, the office line call is transferred from the system of FIG. 2(b) to another system of FIG. 2(a).

For compression of conversation, the handset 7a is put on the key telephone 2-A. Then, control circuit 9a produces the on-hook signal which is transmitted to main control circuit 4a. The main control circuit 4a, then, reset the system of FIG. 2(a) into the initial condition. At that time, the seizure relay Aa is restored and its contact a₁ is open. The signal due to open of the contact a₁, is detected by photo coupler PHb, and main control circuit 4b also resets the system of FIG. 2(b) into the initial condition.

What is claimed is:

1. In a key telephone system comprising a main equipment connected to at least one office line and a plurality of key telephone sets connected to said main equipment, said main equipment comprising an office line interface circuit connected to said office line, a plurality of key telephone interface circuits connected to said key telephone sets, respectively, a switching matrix having cross points for selectively connecting one of said key telephone interface circuits to another one and for selectively connecting said office line interface circuit to one of said key telephone interface circuits, and a main control means connected to said office line interface circuit, said key telephone interface circuits, and said switching matrix and for controlling said switching matrix to perform selected cross-point switching in response to a call request signal, the improvement wherein each of said key telephone sets comprises a system selection key for producing a system call request signal by pushing said system selection key, said main equipment comprising a system interface circuit to be connected to another key telephone system through a connecting line, said switching matrix comprising cross points for selectively connecting one of said key telephone interface circuits to said system interface circuit, and said main control means controlling said switching matrix in response to said system call request signal to connect one of said key telephone interface circuits to said system interface circuit, whereby said key telephone sets may be operatively connected to said another key telephone system through said connecting line.

2. In a key telephone system comprising a main equipment connected to at least one office line and a plurality of key telephone sets connected to said main equipment, said main equipment comprising an office line interface circuit connected to said office line, a plurality of key telephone interface circuits connected to said key telephone sets, respectively, a switching matrix having cross points for selectively connecting one of said key telephone interface circuits to another one and for selectively connecting said office line interface circuit to one of said key telephone interface circuits, and a main control means connected to said office line interface circuit, said key telephone interface circuits, and said switching matrix and for controlling said switching matrix to perform selected cross-point switching in response to a call request signal, the improvement wherein each of said key telephone sets comprises a first system selection key for producing a system call request signal by pushing said first system selection key, said main equipment comprising a system call transmitting interface circuit to be connected to another key telephone system through a first connecting line, and a system call receiving interface circuit to be connected to said another key telephone system through a second connecting line, said switching matrix comprising cross points for selectively connecting one of said key telephone interface circuits to said system call transmitting interface circuit and for selectively connecting one of said key telephone interface circuits to said system call receiving interface circuits, and said main control means controlling said switching matrix in response to said system call request signal to establish cross-point switching to connect said system call transmitting interface circuit to selected one of said key telephone interface circuits.

3. The key telephone system as claimed in claim 2, wherein each key telephone set is provided with an address number input means, said system call transmitting interface circuit being provided with an address signal generating means, said main control means controlling said address signal generating means to generate an address signal in response to an address number from said address number input means and said system call request signal.

4. The key telephone system as claimed in claim 3, wherein said system call receiving interface circuit is provided with an address signal detecting means for detecting the address signal incoming thereto, said main control means further controlling said switching matrix to connect said system call receiving interface circuit to one of said key telephone interface circuits identified by the detected address signal.

5. The key telephone system as claimed in claim 2, wherein said system call transmitting interface circuit being provided with a calling signal generating means for sending out a calling signal to said first connecting line in response to said system call request signal under control of said main control means.

6. The key telephone system as claimed in claim 5, wherein said system call receiving interface circuit is provided with a calling signal detecting means for detecting the calling signal incoming thereto through said second connecting line, said main control means producing a ringing tone driving signal in response to the detected calling signal, each of said key telephones being provided with a ringing tone generator means responsive to said ringing tone driving signal for producing the ringing tone.

7. The key telephone system as claimed in claim 6, wherein each of said key telephone sets is provided with a handset and an off-hook signal generating means for generating the off-hook signal in response to lift-up operation of said handset, said main controlling means controlling said switching matrix to connect said system call receiving interface circuit to one of said key telephone sets in response to said off-hook signal.

8. The key telephone system as claimed in claim 7, wherein each of said key telephone sets is provided with a holding key for generating a holding signal by depressing said holding key, said main equipment being provided with a holding tone generator means, said main control means controlling said switching matrix to connect said holding tone generator means to said office line interface circuit in response to said holding signal from one of said key telephone sets when said one of key telephone sets being connected to said office-line interface circuit through said switching matrix.

9. The key telephone system as claimed in claim 8, wherein each of said key telephone sets is provided with an on-hook signal generating means for generating an on-hook signal in response to putting operation of said handset, said main control means controlling said switching means to disconnect said holding tone generator means and to connect said office-line interface circuit to said system call transmitting interface circuit in response to said on-hook signal from one of key telephone sets which previously generated said holding signal.

* * * * *